United States Patent [19]

Hasegawa

[11] Patent Number: 5,202,706
[45] Date of Patent: Apr. 13, 1993

[54] FOCUSING APPARATUS IN PROJECTION TELEVISION

[75] Inventor: Shinichi Hasegawa, Tokyo, Japan

[73] Assignee: Pioneer Electronic Corporation, Tokyo, Japan

[21] Appl. No.: 396,656

[22] Filed: Aug. 22, 1989

[30] Foreign Application Priority Data

Oct. 6, 1988 [JP] Japan .................. 63-130397[U]

[51] Int. Cl.⁵ .................. G02B 7/02; G02B 15/00
[52] U.S. Cl. .................. 359/819; 359/813; 359/694
[58] Field of Search .................. 358/231, 250, 237; 350/574–577, 245–257, 128, 418, 429–432

[56] References Cited

U.S. PATENT DOCUMENTS

| | | | |
|---|---|---|---|
| 4,322,150 | 3/1982 | Kamata et al. | 350/255 |
| 4,488,787 | 12/1984 | Osawa | 350/255 |
| 4,576,446 | 3/1986 | Kamata | 350/255 |
| 4,585,313 | 4/1986 | Iwata et al. | 350/255 |
| 4,779,964 | 10/1988 | Ozawa et al. | 350/255 |
| 4,834,514 | 5/1989 | Atsuda et al. | 350/255 |

FOREIGN PATENT DOCUMENTS

| | | | |
|---|---|---|---|
| 195812 | 11/1983 | Japan | 350/429 |
| 2115 | 1/1986 | Japan | 350/255 |

Primary Examiner—Bruce Y. Arnold
Assistant Examiner—Thong Nguyen
Attorney, Agent, or Firm—Finnegan, Henderson, Farabow, Garrett and Dunner

[57] ABSTRACT

A focusing apparatus for a projection television comprises a lens barrel with lenses therein having a pair of shaft-like guide protrusions at symmetrically opposite positions on the lens barrel. A cylindrical barrel support member receives and holds the lens barrel in a proper, focused position. A pair of shaft-like guide slots, inclined along the axial direction of the supporting member, receive and guide the guide protrusions as the barrel is rotated within the support member to thereby achieve focusing. Axial ribs are on the outer surface of the support member and axial protrusions are on the inner surface at corresponding positions. A tightening ring or band encircles the support member and engages and presses the ribs resulting in the axial protrusions being pressed against and locking the lens barrel.

6 Claims, 6 Drawing Sheets

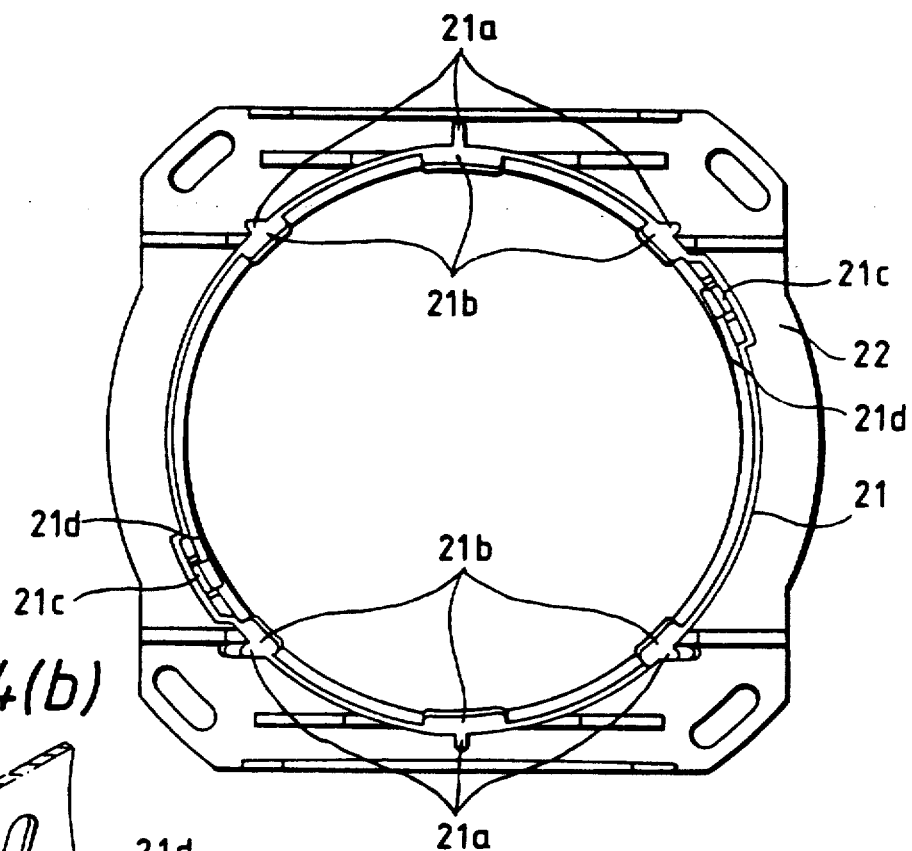
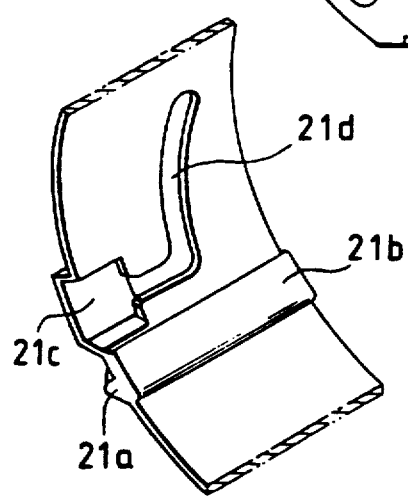
FIG. 4(a)
FIG. 4(b)

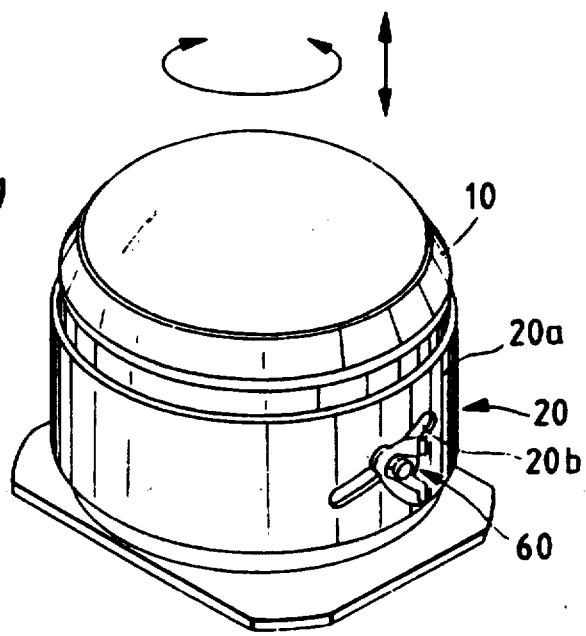
FIG. 6 (PRIOR ART)
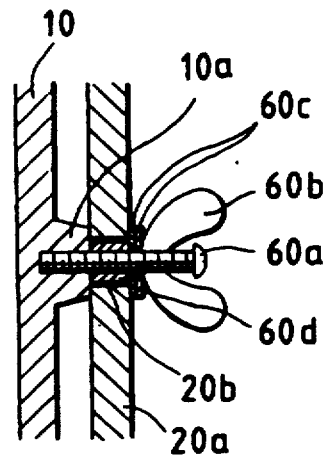
FIG. 7 (PRIOR ART)
FIG. 8 (PRIOR ART)
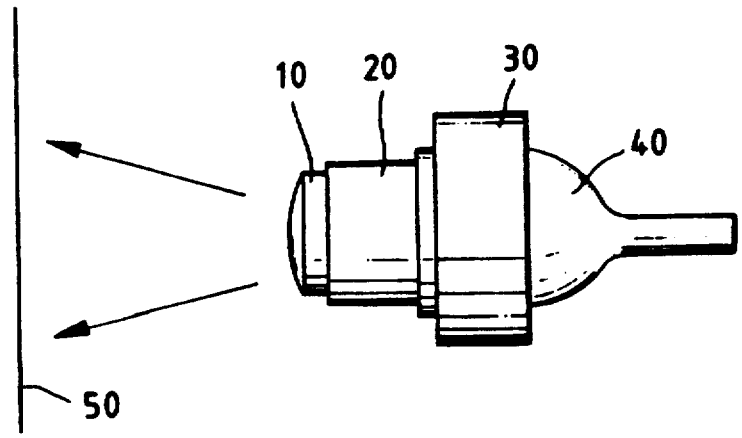

FOCUSING APPARATUS IN PROJECTION TELEVISION

The present invention generally relates to a projector in a projection television set, and particularly relates to an improvement of the structure of a focusing lens barrel and a barrel supporting member for use in a projector.

FIG. 8 shows a projector in a projection television set. A lens barrel 10 having projection lenses incorporated therein is supported by a barrel supporting portion 20. The barrel supporting portion 20 is attached to a projection cathode-ray tube 40 through a coupler 30 for performing optical coupling. An image displayed by the projection cathode-ray tube 40 is projected onto a screen 50 by the projection lenses in the lens barrel 10.

FIG. 6 shows an example of a lens barrel and a barrel supporting portion in the prior art. A cylindrical lens barrel 10 is fitted into a cylinder portion 20a of a barrel supporting portion 20, and a fixing portion 60 is attached to the lens barrel 10 through a slot portion 20b formed through the cylinder portion 20a.

As shown in FIG. 7, the fixing portion 60 includes a screw 60a which is attached through a butterfly nut 60b, a washer 60c and a collar 60d, to a protrusion 10a formed on the side surface of the lens barrel 10. The collar 60d fits in the slot portion 20b formed in the cylinder portion 20a.

The lens barrel 10 is rotated relative to the barrel supporting portion 20 to thereby slide the collar 60d along the slot portion 20b so as to move the lens barrel 10 axially relative to the barrel supporting portion 20 to thereby perform focusing. Upon completion of the focusing, the butterfly nut 60b is tightened to urge the lens barrel 10 against the cylinder portion 20a so that the lens barrel 10 becomes fixed on the barrel supporting portion 20.

One problem of the conventional structure is the large number of parts required and the resulting high cost. Another problem is that it takes a long time to assemble the lens barrel and the barrel supporting portion. Specifically, it is necessary to carry out the steps of making the position of the protrusion 10a agree with the slot portion 20b, inserting the butterfly nut 60b, the washer 60c, and the collar 60d onto the screw 60a, and attaching the screw 60a to the protrusion 10a of the lens barrel 10.

SUMMARY OF THE INVENTION

It is therefore an object of the present invention to solve the foregoing problems in the prior art.

It is another object of the present invention to provide a focusing apparatus in a projection television set in which a lens barrel and a barrel supporting member are improved so that focusing can be performed by sliding the lens barrel in the supporting member, and the number of parts is decreased, thereby simplifying assembling of the lens barrel and the supporting member.

In order to attain the above objects, according to the present invention, the focusing apparatus has a configuration in which shaft-like guide protrusions are integrally formed on a side surface of a lens barrel, and grooves inclined relative to the axial direction of the cylindrical support member are formed in a side surface of the cylindrical support member so that the guide protrusions are slidable in the condition that the guide protrusions are fitted in the grooves.

BRIEF DESCRIPTION OF THE DRAWINGS

FIGS. 4(a) and 4(b) are views showing the barrel supporting portion for supporting the lens barrel in the same embodiment;

FIG. 6 is a view showing an example of the conventional lens barrel and barrel supporting portion;

FIG. 7 is a view showing the fixing portion in the conventional example of FIG. 6; and FIG. 8 is a view showing a projector in a projection television set according to the present invention.

DETAILED DESCRIPTION OF THE PREFERRED EMBODIMENT

Figure 1:
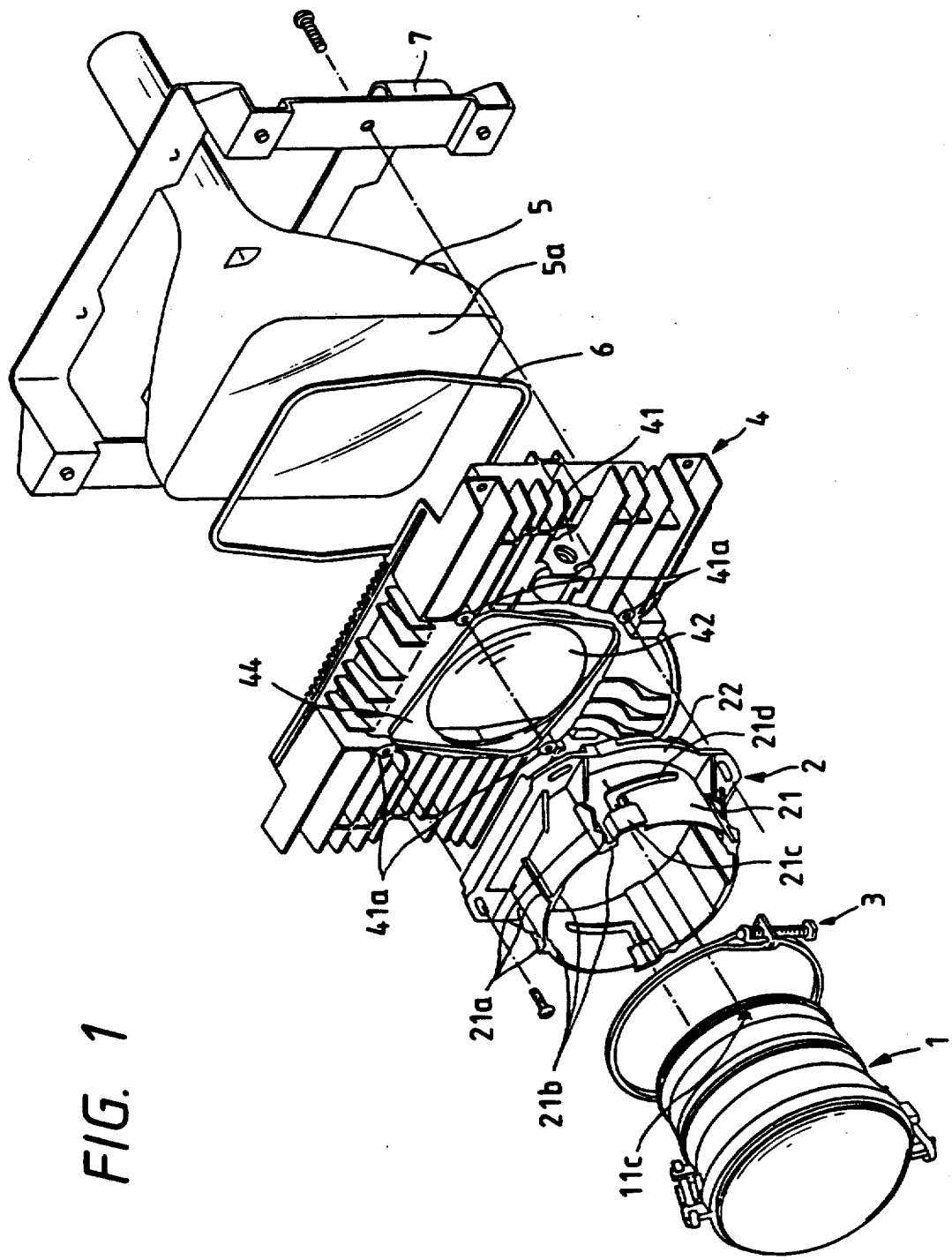
FIG. 1 is an exploded perspective view showing an embodiment of the projector according to the present invention.
Figure 2:
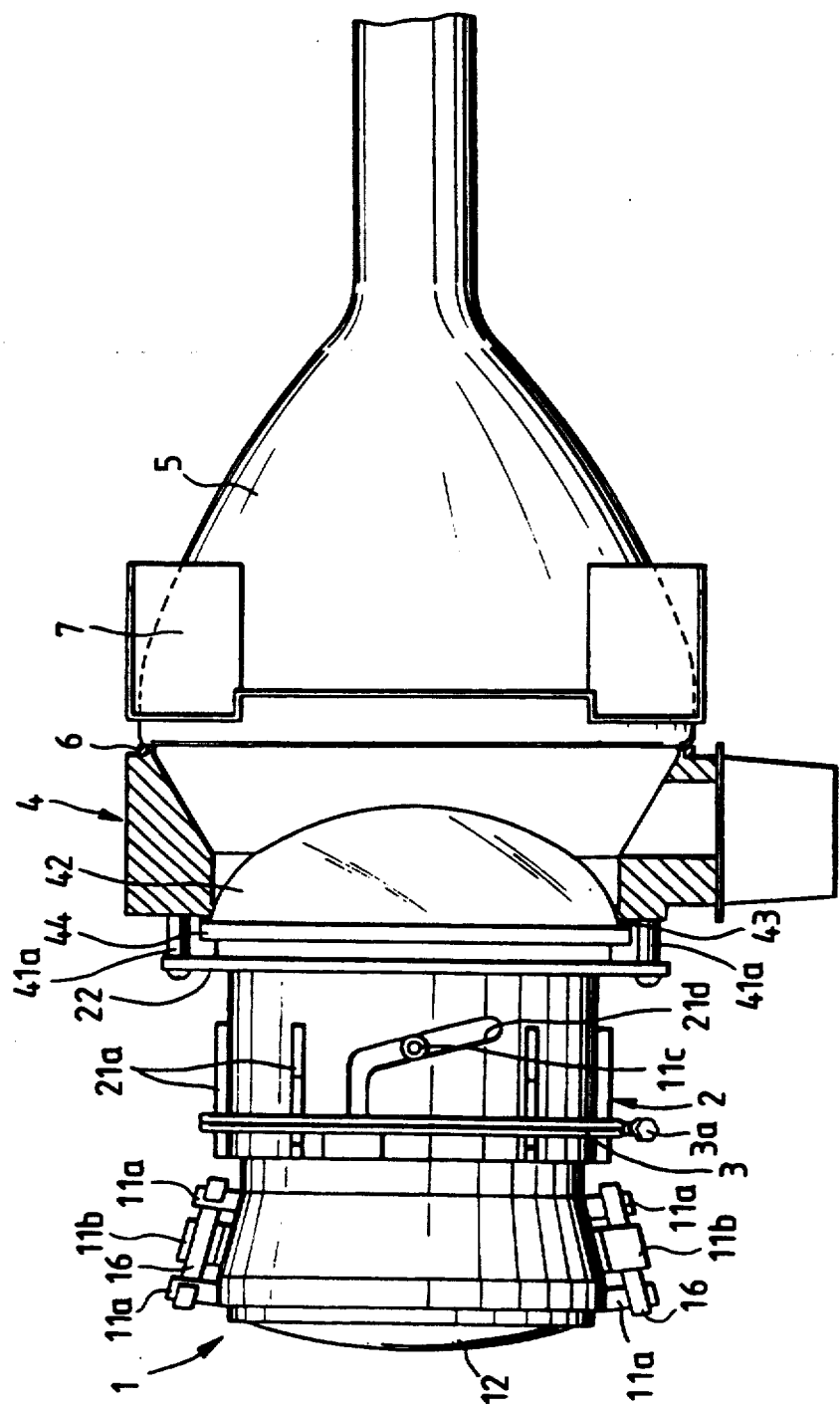
FIG. 2 is a sectional view showing the apparatus of FIG. 1 in the assembled state.

FIG. 1 is an exploded perspective view showing an embodiment of the projector according to the present invention. FIG. 2 is a sectional view showing the projector in the assembled state. In the drawing, the reference numeral 1 designates a lens barrel including plural groups of lenses incorporated therein for correcting various aberrations to serve mainly to focus an image, and 2 designates a barrel supporting portion having a cylinder portion 21 for inserting the lens barrel 1 therein and a flange 22. The lens barrel 1 is inserted into the cylinder portion 21 and then fixed in the barrel supporting portion 2 by tightening the outer circumference of the cylinder portion 21 by means of a wire band 3.

The reference numeral 4 designates a coupler for cooling a tube surface 5a of a projection cathode-ray tube 5 and for optically coupling the lens barrel 1 slide optical system and the projection cathode-ray tube 5 with each other. A meniscus lens 42 for mainly correcting curvature of the field is fixed, by a lens fixing frame 44, onto a coupler frame 41 molded by aluminum die casting, through a packing 43. The projection cathode-ray tube 5 and the coupler frame 41 are fixed to each other by a mount frame 7 with a packing 6 interposed therebetween. A liquid for performing optical coupling and cooling is sealed between the meniscus lens 42 and the projection cathode-ray tube 5.

Further, four columnar fixing sheets 41a are formed on the coupler frame 41 so as to surround the meniscus lens 42, and the barrel supporting portion 2 is fixed on the coupler frame 41 by fixing the flange 22 onto the fixing seats 41a by means of screws.

Figure 3:
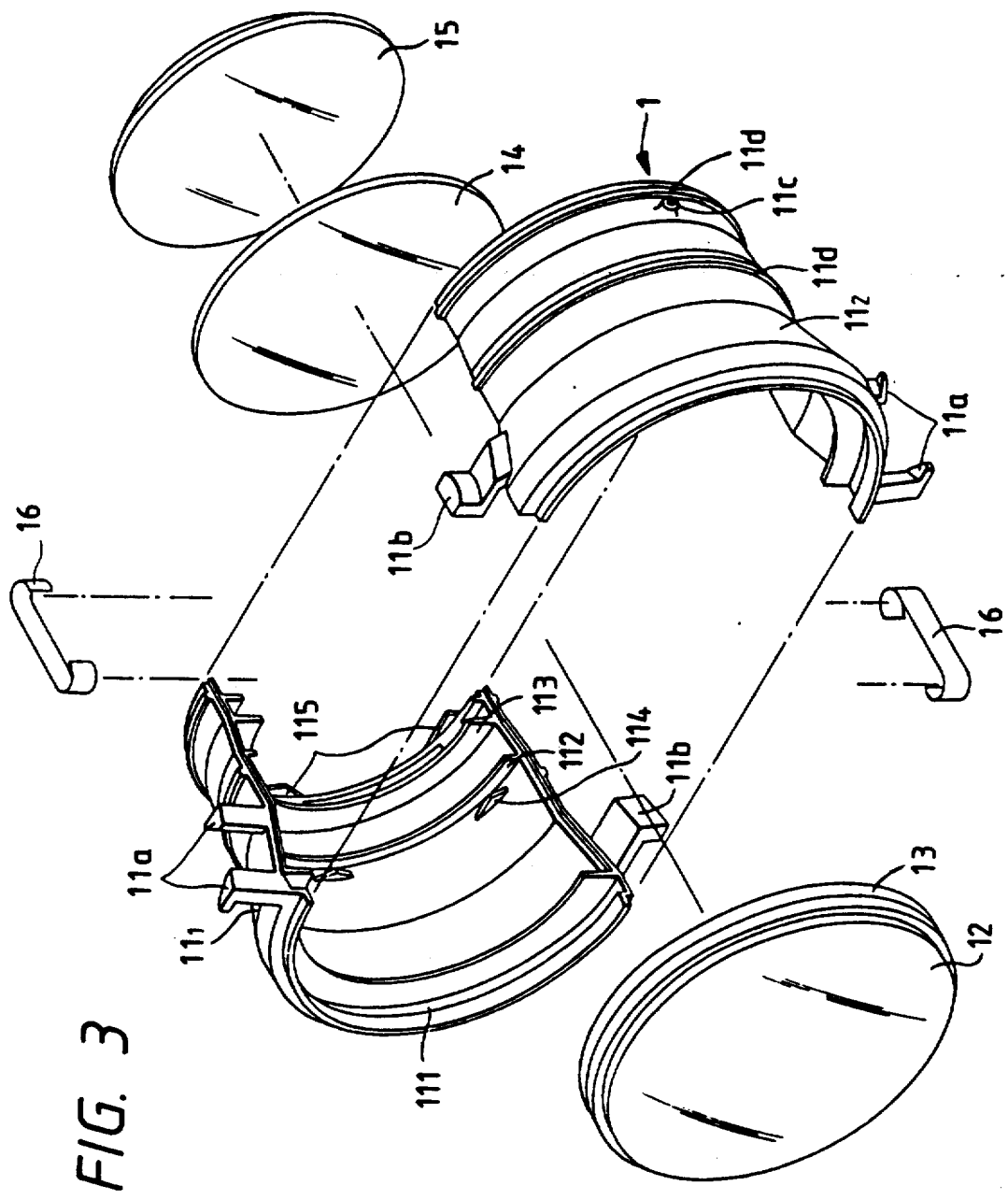
FIG. 3 is an exploded perspective view showing the lens barrel in the embodiment.

FIG. 3 is an exploded perspective view showing the lens barrel 1. The lens barrel 1 has a configuration in which a first group of lenses 12, a second group of lenses 13, a third group of lenses 14, and a fourth group of lenses 15 are fitted into a barrel frame 11 halved into barrel frame portions $11_1$ and $11_2$ formed by the same mold. The barrel frame portions $11_1$ and $11_2$ are fixed to each other at pawl portions 11a and 11b formed on opposite side surfaces of the barrel frame portions $11_1$ and $11_2$ by metal elastic plates 16, so that the barrel frame portions $11_1$ and $11_2$ are attached to one another.

The first and second groups of lenses 12 and 13 are integrated with each other with their flange portions fitted to each other, and the integrated first and second groups of lenses 12 and 13 fit in a groove portion 111 formed in an inner wall of a front edge of the barrel frame 11. Further, the third and fourth groups of lenses 14 and 15 fit respectively between retaining plates 112 and 113 and pawls 114 and 115 formed at predetermined positions in the inner wall of the barrel frame.

Since the barrel frame 11 is halved into the two divisional portions $11_1$ and $11_2$ in this embodiment, it is very easy to assemble the lens barrel 1.

Further, focusing guide protrusions 11c, described later, and collars 11d abutting on the inside of the barrel supporting portion 2 are formed on the side surface of the barrel frame 11.

FIG. 4(a) is a view showing the barrel supporting portion 2 for supporting the lens barrel when viewed from the side of lens barrel 1, and FIG. 4(b) is a perspective view showing a portion of the barrel supporting portion 2.

As shown in the drawings, six ribs 21a, elongated in the axial direction of the cylinder, are formed on an outer circumferential side surface of the cylinder portion 21, and six protrusions 21b, elongated in the same direction as that of the ribs 21a, are formed on an inner circumferential side surface of the cylinder portion 21 so that the protrusions 21b are disposed at the back of the ribs 21a, respectively. Further, the cylinder portion 21 is formed so as to be elastically transformed to an extent. The thickness of portions between the ribs 21a (the protrusions 21b), particularly, is reduced so as to form an elastic structure. The wire band 3 is wound around the ribs 21a as described above.

Two inlets 21c allow passage therethrough of the focusing guide protrusions 11c formed on the side surface of the lens barrel 1. The inlets 21c are formed in the cylinder portion 21 at axially symmetrical positions, and guide grooves 21d are formed in the side surface of the cylinder portion 21 so as to slantingly extend from the bottoms of the inlets 21c, as shown in FIG. 4(b).

When the lens barrel 1 is inserted into the cylinder portion 21, the focusing guide protrusions 11c pass through the inlets 21c and slide into the guide grooves 21d. The lens barrel 1 is then rotated relative to the barrel supporting portion 2 causing guide protrusions 11c to slide along the side surfaces of the focusing guide grooves 21d. The distance between the lens barrel 1 and the tube surface 5a of the projection cathode-ray tube 5 changes with the rotation of the lens barrel 1 to thereby perform focusing.

The focusing guide protrusions 11c and the grooves 21d suffice to rotate the lens barrel 1 and displace it in the direction of the optical axis of the lenses. Therefore, the number of parts is decreased and the assembling of the lens barrel 1 and the barrel supporting portion 2 is easy.

Figure 5A:
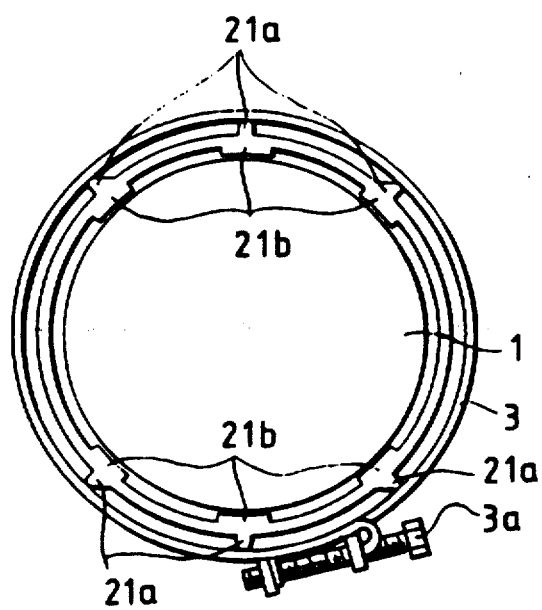
FIGS. 5(a) and 5(b) are views for explaining the method of fixing the lens barrel in the same embodiment.
Figure 5B:
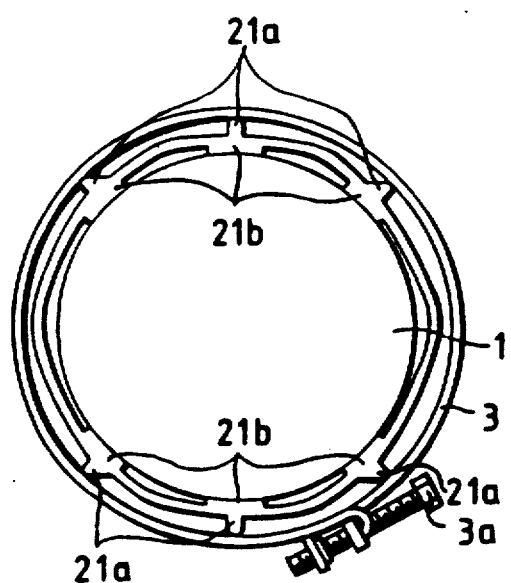

Further, if a tightening screw 3a of the wire band 3 wound around the outer circumference of the ribs 21a is tightened after completion of focusing, the cylinder portion 21 is elastically transformed from the state shown in FIG. 5(a) to the state shown in FIG. 5(b). The resulting shape is polygonal and reduces the diameter of a circle inscribed in the inner circumference of the protrusions 21b to thereby fix the lens barrel 1 to the barrel supporting portion 2. At this time, each of the protrusions 21b moves by an equal distance toward the center, that is, the optical axis of the lens barrel 1, so that the optical axis of the lens barrel is made to coincide with the center axis of the cylinder portion 21.

As described above, according to the present invention, in a projector of a projection television set, the shaft-like guide protrusions are formed on the side surface of the lens barrel and the grooves are formed in the cylindrical side surface of the lens barrel support member so as to slantingly extend relative to the axial direction of the cylinder so that the guide protrusions are made to slide in the condition that they are fitted in the grooves formed in the support member. Therefore, it is possible to obtain the focusing apparatus in which focusing can be performed by relative sliding between the lens barrel and the support member, in which the number of parts is decreased, and the assembling of the lens barrel and the support member is easy.

What is claimed is:

1. A focusing apparatus for a projection television comprising:

a cylindrical lens barrel having lenses mounted therein, said cylindrical lens barrel being supported by a cylindrical support member within which said cylindrical lens barrel is operatively slidable to allow focusing of said projection television;

shaft-like guide protrusions integrally formed on the outside surface of said cylindrical lens barrel, and guide grooves formed in the surface of said cylindrical support member so that said shaft-like guide protrusions fit in said grooves, said grooves being inclined relative to the axial direction of said cylindrical support member;

inlet means for passing said shaft-like guide protrusions into said guide grooves formed on the surface of said cylindrical support member;

a plurality of axially extending ribs on the outside surface of said cylindrical support member and a plurality of axially extending protrusions on the inside surface of said cylindrical support member at positions corresponding to positions of said plurality of axially extending ribs;

a tightening ring encircling said cylindrical support member and in contact with said ribs, whereby tightening of said ring elastically deforms said cylindrical support member to cause said plurality of axially extending protrusions to press against said lens barrel and to hold said lens barrel in position.

2. The focusing apparatus for a projection television as claimed in claim 1, wherein two of said shaft-like guide protrusions are positioned symmetrically about said cylindrical lens barrel and two of said grooves are positioned to correspond with said shaft-like guide protrusions.

3. The focusing apparatus for a projection television as claimed in claim 1, wherein said cylindrical lens barrel is made from two lens barrel halves, and a plurality of lenses are mounted within and held in place within said two lens barrel halves when said two lens barrel halves are attached together.

4. A focusing apparatus for a projection television comprising:

a cylindrical lens barrel having lenses mounted therein, said cylindrical lens barrel being supported by a cylindrical support member within which said cylindrical lens barrel is operatively slidable to allow focusing of said projection television;

shaft-like guide protrusions integrally formed on the outside surface of said cylindrical lens barrel, and guide grooves formed in the surface of said cylindrical support member so that said shaft-like guide protrusions fit in said grooves, said grooves being inclined relative to the axial direction of said cylindrical support member; and inlet means for passing said shaft-like guide protrusions into said guide grooves formed on the surface of said cylindrical support member; wherein two of said shaft-like guide protrusions are positioned symmetrically about said cylindrical lens barrel and two of said grooves are positioned to correspond with said shaft-like guide protrusions.

5. A focusing apparatus for a projection television comprising:

a cylindrical lens barrel having lenses mounted therein, said cylindrical lens barrel being supported by a cylindrical support member within which said cylindrical lens barrel is operatively slidable to allow focusing of said projection television, shaft-like guide protrusions integrally formed on the outside surface of said cylindrical lens barrel, and guide grooves formed in the surface of said cylindrical support member so that said shaft-like guide protrusions fit in said grooves, said grooves being inclined relative to the axial direction of said cylindrical support member;

inlet means for passing said shaft-like guide protrusions into said guide grooves formed on the surface of said cylindrical support member; and lens barrel halves, said lens barrel halves forming said cylindrical lens barrel, wherein a plurality of lenses are mounted within and held in place within said lens barrel halves when said lens barrel halves are attached together.

6. The focusing apparatus for a projection television as claimed in claim 5, wherein two of said shaft-like guide protrusions are positioned symmetrically about said cylindrical lens barrel and two of said guide grooves are positioned to correspond with said shaft-like guide protrusions.

* * * * *